June 27, 1933.  C. E. DOUGLAS ET AL  1,915,520
TIDAL POWER APPARATUS
Filed July 20, 1931    3 Sheets-Sheet 1
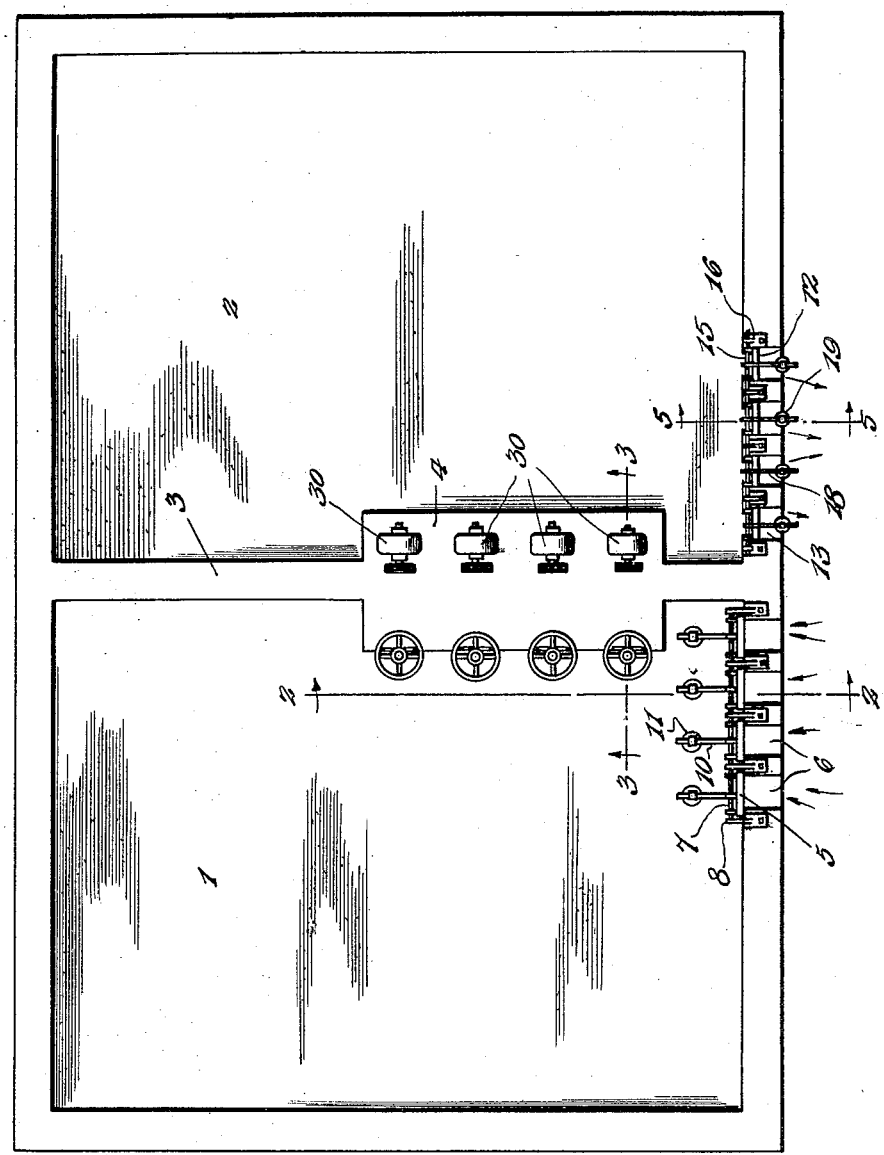
Inventors
C. E. Douglas.
J. Morgan.
By Lacey & Lacey, Attorneys

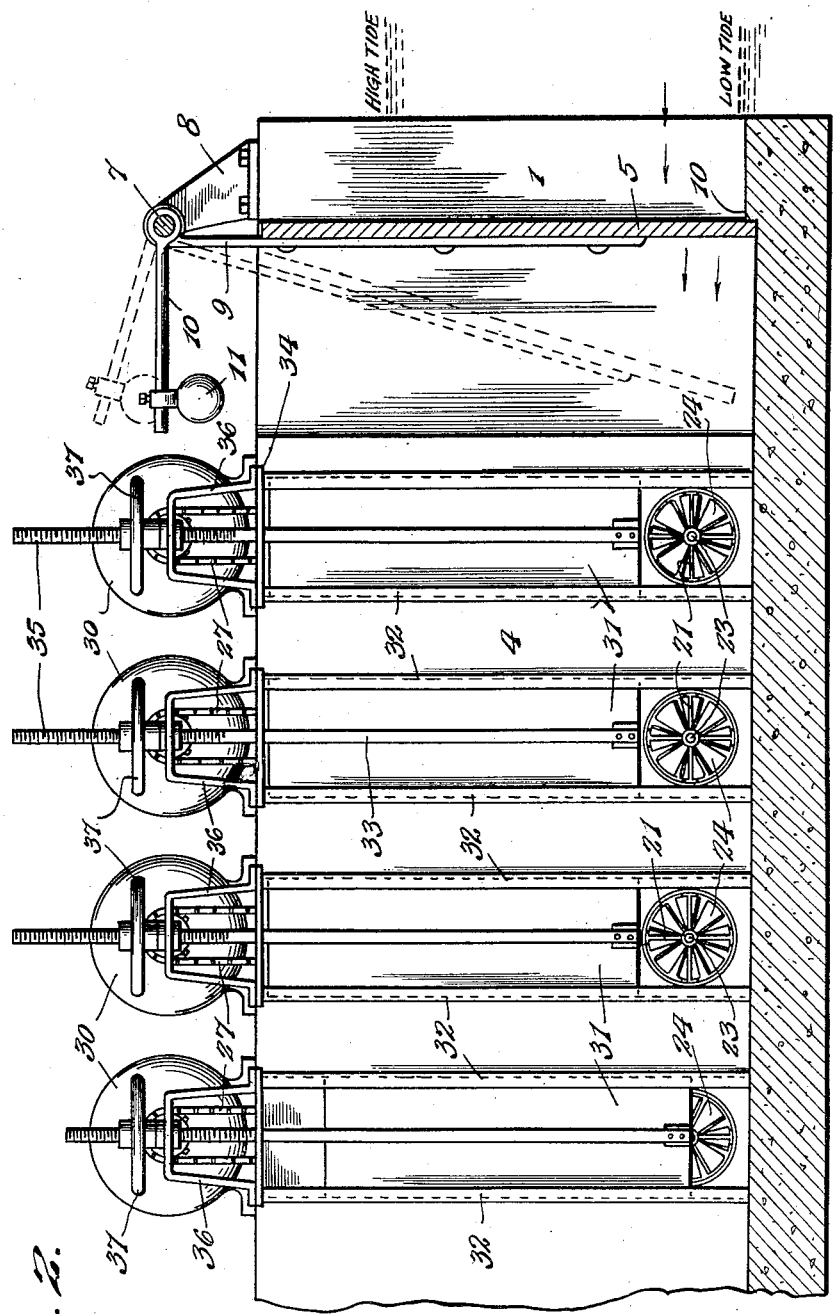

June 27, 1933. C. E. DOUGLAS ET AL 1,915,520
TIDAL POWER APPARATUS
Filed July 20, 1931 3 Sheets-Sheet 3
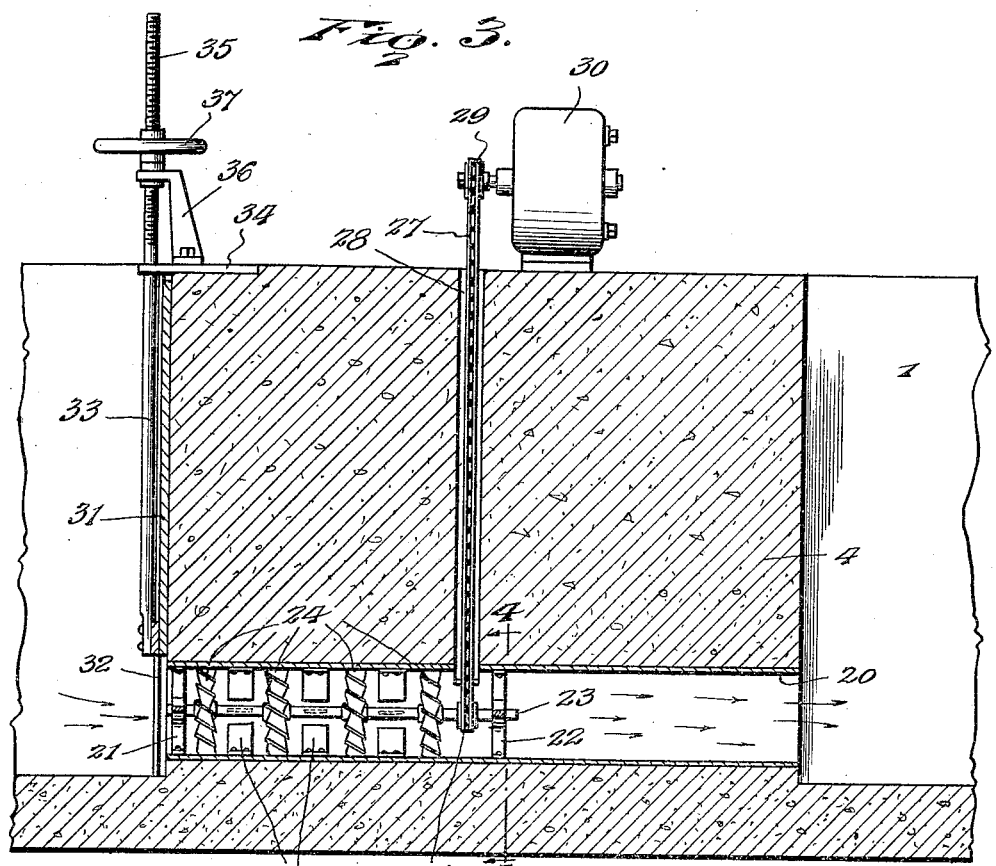
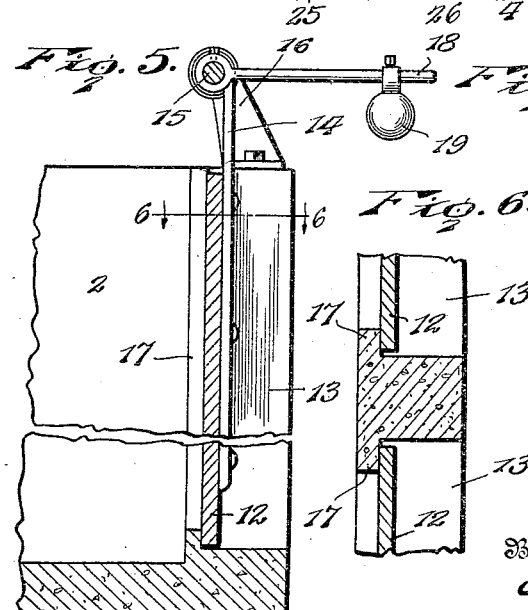
Inventors
C. E. Douglas.
J. Morgan.
By Lacy & Lacy,
Attorneys Patented June 27, 1933

1,915,520

UNITED STATES PATENT OFFICE

CHARLES E. DOUGLAS AND JOHN MORGAN, OF HOQUIAM, WASHINGTON

TIDAL POWER APPARATUS

Application filed July 20, 1931. Serial No. 551,991.

This invention relates to apparatus for utilizing the tides to generate power, and the object is to provide an inexpensive, compact and easily controlled apparatus which will operate automatically to drive machinery, being intended more particularly for driving generators to create electric current. The invention is illustrated in the accompanying drawings and consists in certain novel features which will be hereinafter first fully described and then more particularly defined in the appended claims.

In the drawings,

Figure 1 is a top plan view of an apparatus embodying the invention,

Fig. 2 is an enlarged sectional elevation, the section being taken on the line 2—2 of Fig. 1, Fig. 3 is a transverse section on the line 3—3 of Fig. 1, Fig. 4 is a detail section on the line 4—4 of Fig. 3, Fig. 5 is a section on the line 5—5 of Fig. 1, and Fig. 6 is a detail section on the line 6—6 of Fig. 5.

In carrying out the invention, we provide reservoirs 1 and 2 which are separated by a partition 3, as indicated in Fig. 1. The walls of these reservoirs and the partition may be constructed of any material which will withstand the pressure and usage to which they will be subjected, and are preferably constructed of piling and reinforced concrete. The walls and the partition will be of substantial thickness to provide the desired strength, and at one point in the partition will be constructed a foundation or lower wall of a power house, the foundation being indicated at 4, and the remaining portion of the power house being omitted as it may be of any usual construction and in itself forms no part of the invention. It will be noted that in Fig. 1 we have illustrated reservoirs including four walls arranged in rectangular formation, but this particular design of the reservoirs is not essential and in many instances it will be possible to utilize the shore line for the inner walls of the reservoirs.

In the outer wall of each reservoir is arranged a plurality of gates which in one instance will open inwardly and in another instance will open outwardly. In the present drawings, four gates have been shown in the wall of each reservoir.

The gates 5 control the inflow into the receiving reservoir 1 and each gate controls an inlet opening 6 formed in the outer wall of the reservoir, a shaft or supporting rod 7 being mounted in suitable bearings 8 at the top of the wall and extending the full length of all the openings 6, as will be understood. The gates may be of any detail construction which will possess the requisite strength, and each gate is hung upon the rod 7 by hangers 9 secured to the gate and projecting above the upper end thereof, as clearly shown in Fig. 2. The gate tends to assume a vertical position resting against the inner surface of the wall of the reservoir and having its lower end resting against a shoulder 10 formed in the wall, as clearly shown in Fig. 2. It will thus be seen that the gate can not swing outwardly, but it may swing inwardly, and, in the operation of the apparatus, the gate does swing inwardly under the pressure from the flood tide. Connected with the hangers 9 is a lever 10 which is adapted to swing about the rod 7 with the corresponding gate and is equipped with a counterweight 11 adjustable along the lever so that the gate may be set to open under any predetermined pressure from the water.

The gates 12 controlling the openings 13 through the wall of the outlet reservoir are of the same detail construction as the gates 5 and are suspended by hangers 14 upon a rod 15 which is mounted in suitable bearings 16 at the top of the wall. The gates 12 are arranged to open outwardly, and their inward movement is limited by jambs 17 fitted or formed in the openings 13 at the inner end of the same, as will be understood upon reference to Fig. 5. Each gate 12 is equipped with a lever 18 upon which is an adjustable counterweight 19 operating in the same manner as the levers 10 and the counterweights 11 thereon, except that the levers 18 project outwardly and the levers 10 extend inwardly. The gates 12 will be held in closed position by the flood tide cooperating with the counterweights 19, but on the ebb tide the pressure within the reservoir will serve to open the gates and the water stored in the outlet reservoir will be permitted to discharge.

It will be understood that the flow of the water from the inlet reservoir to the outlet reservoir is utilized to generate power, and, to permit the flow of the water, openings are formed through the partition or base 4 at the floor of the reservoirs, an open-ended tube 20 being secured firmly in each opening, as will be understood upon reference to Fig. 3. Disposed within each tube are bearing brackets 21 and 22, the bracket 21 being disposed immediately adjacent the entrance end of the tube, and the bracket 22 being located at any desired point between the ends thereof. A shaft 23 is mounted in these brackets and extends between the same axially of the respective tube. Upon the shaft 23, we secure a plurality of water wheels 24 which are directly in the path of the flowing water and will be caused to turn thereby, and, between each pair of wheels, we provide baffles or interrupters 25 of any approved form, whereby the water will be prevented from whirling and will be caused to act upon the wheels in a straight line. At a convenient point in the length of each shaft 23 is secured a sprocket wheel 26 about which is trained a chain 27 which extends upwardly through a passage 28 provided therefor in the foundation 4 and having its upper portion trained about a sprocket 29 on the shaft of a generator 30. The generator 30 may be of any known or approved form and is illustrated conventionally only, it being noted that the generators may be provided in any desired number and each generator may be arranged to be driven by a shaft located within an opening through the foundation 4 below the generator.

In order that the flow of water through the respective tubes 20 may be shut off or controlled as desired, we provide, at the entrance end of each tube, a valve 31 which may conveniently consist of a plate of any suitable material slidably mounted in guides 32, disposed vertically upon the surface of the foundation 4, and adapted when lowered to extend over the entrance end of the respective tube 20. Each valve has an operating rod 33 secured upon its outer side, and said rod extends upwardly through and above a guide 34 provided at the top of the partition. The upper end portion of each rod 33 is threaded, as indicated at 35, and extends loosely through a bracket 36 erected on the wall. A hand wheel 37 has threaded engagement with the upper portion of the rod 33 and rests upon the upper end of the bracket 36, as shown in Fig. 3. If the hand wheel be rotated, the threaded portion of the rod 33 will be caused to travel endwise through the hub of the wheel and, consequently, the gate will be raised or lowered accordingly as the wheel is turned in one or the opposite direction. The entrance to the tube 20 may thus be closed partially or entirely, as may be desired and as will be understood.

From the foregoing description, taken in connection with the accompanying drawings, the operation will be readily understood. When the tide is coming in or at the flood, the gates 5 will be opened so that the water will be collected in the inlet reservoir 1, and it may be stored in said reservoir until the machinery is to operate, whereupon the proper cut-off valves 31 will be raised so that the water may then flow through the tubes 20 into the outlet reservoir 2. In flowing through the several tubes 20, the water will, of course, act upon the wheels 24 and rotate the shaft 23 so that motion will be transmitted through the sprocket gearing to the generator or other machinery to be driven. During flood tide, the outlet gates 12 will be held closed, and the water passing into the outlet reservoir will be held therein by the greater pressure of the water on the outer sides of the gates. When the tide ebbs, the pressure on the outer sides of the outlet gates will be reduced and the gates will then open under the pressure within the reservoir so that the water may discharge. At this time, the gates 5 will, of course, be closed, so that the water which may be stored in the reservoir 1 will be held therein, but, upon the next flood tide, water will be admitted to the reservoir 1 to take the place of the water which has been used and permitted to flow from said reservoir. By the use of this apparatus, power may be generated at an exceedingly low cost, and the apparatus is especially desirable for generating electricity which may be transmitted to distant points to furnish light, heat or power.

Having thus described the invention, we claim:

Tidal power apparatus comprising inlet and outlet reservoirs, a partition between the reservoirs having a lateral enlargement constituting a foundation and provided with side faces one of which is arranged in a vertical plane, there being transverse water passages in the lower portion of the foundation and opening through the side faces thereof for establishing communication between the reservoirs and spaced vertical openings in the foundation having their lower ends communicating with said water passages and their upper ends opening through the top of the foundation, water wheels in said passages, machinery to be driven mounted on the top of the foundation, means disposed within the vertical openings and operatively connected with the water wheels and said machinery for transmitting motion from the water wheels to the machinery, bearing brackets secured to the foundation and overhanging the vertical side face thereof, guides secured to said vertical side face, vertically movable valves slidably mounted between the guides, threaded actuating rods connected with the valves and extending through the bearing brackets, adjusting members engaging the threads on the rods and bearing against the brackets for raising and lower the valves to control the flow of water through the transverse passages, and gates in the wall of each reservoir to control the flow of water to and from the same.

In testimony whereof we affix our signatures.

CHARLES E. DOUGLAS. [L. S.]
JOHN MORGAN. [L. S.]